United States Patent
Schaupp, Jr. et al.

[11] Patent Number: 5,903,852
[45] Date of Patent: *May 11, 1999

[54] RADIOTELEPHONE OPERATING TECHNIQUE

[75] Inventors: George W. Schaupp, Jr., Schaumburg; Laura A. Sheley, Prospect Heights; Kirk W. Dailey, Palatine, all of Ill.

[73] Assignee: Motorola, Inc., Schaumburg, Ill.

[*] Notice: This patent is subject to a terminal disclaimer.

[21] Appl. No.: 08/711,578

[22] Filed: Sep. 10, 1996

Related U.S. Application Data

[63] Continuation of application No. 08/544,742, Oct. 18, 1995, Pat. No. 5,594,778, which is a continuation of application No. 08/228,173, Apr. 15, 1994, abandoned, which is a continuation of application No. 07/650,346, Feb. 4, 1991, abandoned.

[51] Int. Cl.$^6$ ........................................... H04Q 7/32
[52] U.S. Cl. ............................. 455/564; 455/550
[58] Field of Search ..................... 455/564, 550, 455/403, 418, 566; 379/354, 355, 356, 368

[56] References Cited

U.S. PATENT DOCUMENTS

| | | | |
|---|---|---|---|
| 4,425,627 | 1/1984 | Eibner | 395/354 |
| 4,736,410 | 4/1988 | Nishida et al. | 455/564 |
| 4,769,516 | 9/1988 | Allen | 200/5 R |
| 4,872,196 | 10/1989 | Royer et al. | 455/564 |
| 4,979,207 | 12/1990 | Baum et al. | 379/112 |
| 5,007,077 | 4/1991 | Fields et al. | 379/67 |
| 5,095,503 | 3/1992 | Kowalski | 455/564 |
| 5,247,565 | 9/1993 | Joglekar et al. | 455/566 |
| 5,303,288 | 4/1994 | Duffy et al. | 455/566 |
| 5,594,778 | 1/1997 | Schaupp, Jr. et al. | 455/564 |

FOREIGN PATENT DOCUMENTS

| | | |
|---|---|---|
| 0279 233 | 1/1988 | European Pat. Off. . |
| 3139501C1 | 2/1983 | Germany . |
| 3825898A1 | 2/1990 | Germany . |
| 62-23266 | 1/1987 | Japan . |

OTHER PUBLICATIONS

Motorola Micro TAC 9800XL Cellular Portable Telephone User's Manual, 1989. This manual describes the operation of a cellular portable telephone which is currently available.

Primary Examiner—Dwayne D. Bost
Assistant Examiner—Myron K. Wyche
Attorney, Agent, or Firm—John J. Oskorep

[57] ABSTRACT

The present disclosure includes a discussion of an operating technique for a radiotelephone (101). The radiotelephone (101) has a memory (907), a display (127) and a keypad (117) which includes a first function key (107), a second function key (109), and a plurality of data keys (119). An actuation of the first function key (107) creates a first function key signal for recalling a telephone number. Once the telephone number has been selected, a subsequent actuation of the first function key (107) creates a second function key signal for connecting a call based on the telephone number. During the call, an actuation of the second function key (109) creates a third function key signal for disconnecting the call. A subsequent actuation of the second function key (109) creates a fourth function key signal for turning off the radiotelephone (213).

13 Claims, 6 Drawing Sheets

RADIOTELEPHONE OPERATING TECHNIQUE

The instant application is a contiuation application based on application Ser. No. 08/544,742 filed on Oct. 18, 1995, now U.S. Pat. No. 5,594,778 issued on Jan. 14, 1997, which is a continuation of application Ser. No. 08/228,173 filed Apr. 15, 1994 and now abandoned, which is a continuation of application Ser. No. 07/650,346 filed Feb. 4,1991 and now abandoned.

FIELD OF THE INVENTION

This invention is generally related to radiotelephones and more specifically to methods of operating a radiotelephone.

BACKGROUND OF THE INVENTION

There is essentially one known technique of using a keypad for controlling a radiotelephone. The technique uses from four to twelve function keys in addition to the standard twelve key data pad and it includes a display for the data input.

The function keys generally include some or all of the following functions: send, end, power, recall, store, clear, function, name, volume and menu. The number and type of keys depends on the manufacturer and the features on the phone.

The function keys which are essential to the operation of the phone are the send, end, power and clear keys. The send key is used to initiate a phone call to the number entered with the data keys and located in the display. The end key is used to end a phone call. The power key is used to turn the radiotelephone on and off with successive key activations. The clear button is used when entering data to clear either one character of data or the entire display of data, depending on how the key is used.

There are three keys which can be used to store and recall names and phone numbers from the radiotelephone memory, namely, the store key, the recall key, and the name key. The store key is used to store data into a memory location. First, the data is entered into the radiotelephone with the data keys, then the store key is pressed, followed by a memory location entered with the data keys. This data can be either symbols, representing names or numbers representing phone numbers. The recall key followed by an appropriate memory location will recall the phone number or name contained within that memory location. The name key is used to activate a menu of names which have phone numbers corresponding to them. The user can scroll through the menu of names using the "#" and the "*" keys.

There are other keys which activate features of the phone which vary between manufacturers. The function key is used to activate other features of the phone denoted by the number input with the data keys which follow activation of the function key. Finally, the menu key is used to access a menu of advanced features which can be scrolled through using the "#" and the "*" keys.

With thorough knowledge of the operation of these keys, a complicated radiotelephone can be successfully operated. However, a high percentage of people do not access the advanced features of the phone because of lack of understanding of the complexities involved in such use. Therefore, there exists a need for an improved technique for operating a radiotelephone; one in which the operation of the radiotelephone is intuitive to the uneducated user.

SUMMARY OF THE INVENTION

The present invention encompasses a method of operating a radiotelephone. The radiotelephone has a memory, a display and a keypad with at least one key to produce at least a first function key signal and a second function key signal, and a plurality of data keys.

The method comprises creating a first function key signal from a first function key to turn on the radiotelephone; selecting a phone number; creating a second function key signal from said first function key, activating the radiotelephone to call said phone number; creating a third function key signal from a second function key disconnecting the radiotelephone from said call; and creating a fourth function key signal from said second function key, turning off the radiotelephone.

DESCRIPTION OF A PREFERED EMBODIMENT

Figures 1, 2:
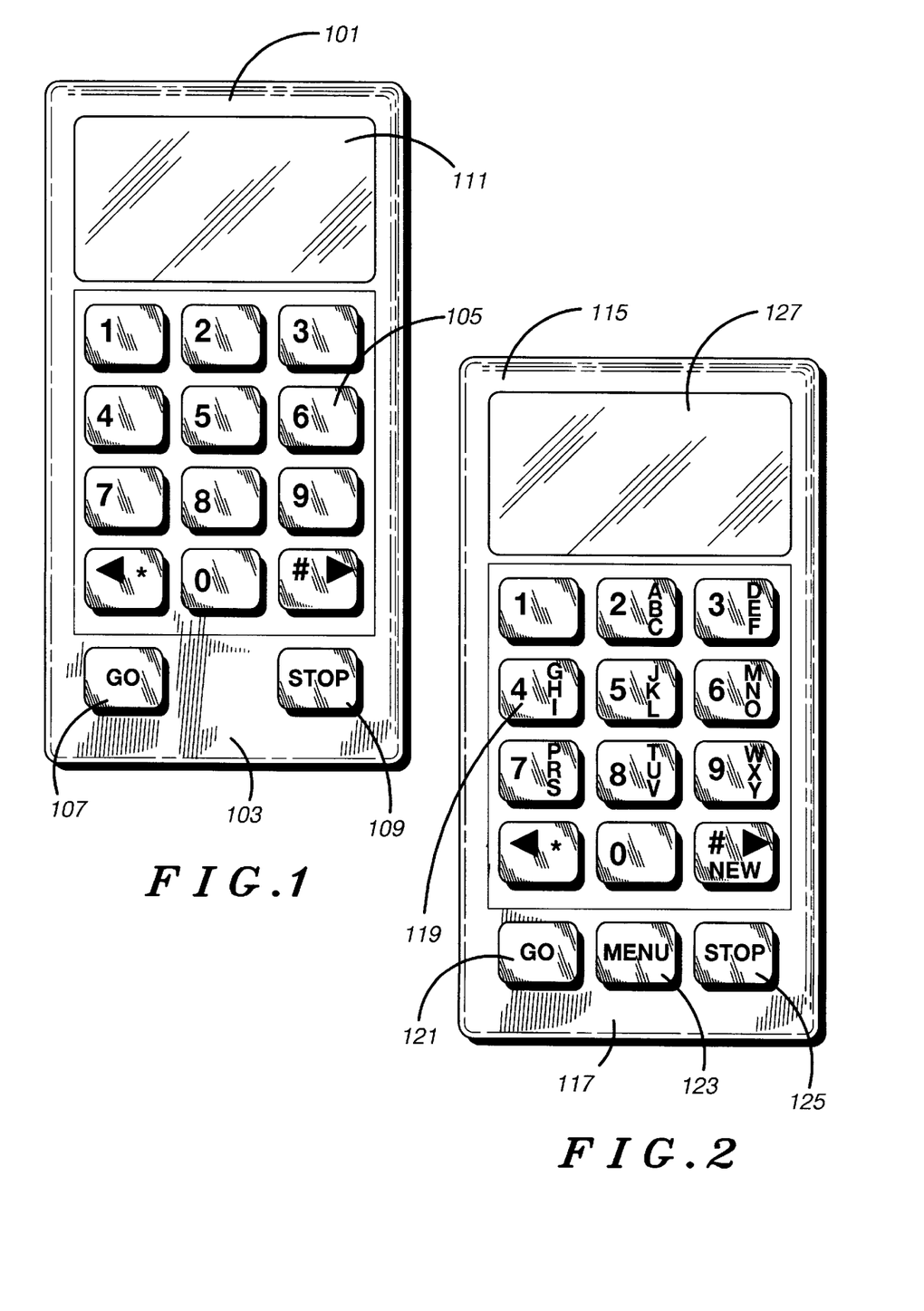
FIG. 1 is a drawing of an embodiment which may include the present invention.
FIG. 2 is drawing of an alternate embodiment which may include the present invention.

FIG. 1 reveals a first embodiment of the disclosed invention. The radiotelephone 101 contains a a display 111, a keypad 103 which has a standard 12 data keys 105, plus two additional function keys 107 and 109. The standard 12 data keys contain the numbers from 0 to 9, the "#" key and the "*" key. The two additional function keys are the go key 107 and the stop key 109.

FIG. 2 reveals a second embodiment of the disclosed invention it is a radiotelephone 115 having a display 127, a keypad 117 containing a standard 12 data key inputs 119 containing symbols on the keys as follows: Data key 2 containing number 2 and alpha characters A, B, and C, data key 3 containing D, E and F, data key 4 containing G, H and I, data key 5 containing J,K and L, data key 6 containing M, N and O, data key 7 containing P, R and S, data key 8 containing T, U and V, and data key 9 containing W, X and Y. The "*" and "#" keys contain directional arrows. Although in this embodiment alpha characters are used, other symbols may substituted such as kata-kana, as described in U.S. Pat. No. 4,872,196, issued on Oct. 3, 1989 on behalf of Paul Royer et al., with the same assignee as the present invention, titled "Telephone Keypad Input Device". The keypad 117 also contains three function buttons, 121, 123, 125. These are the go key 121, the menu key 123 and the stop key 125. The operation of these three function keys in the operation of the radiotelephone 101 follows.

Figure 3:
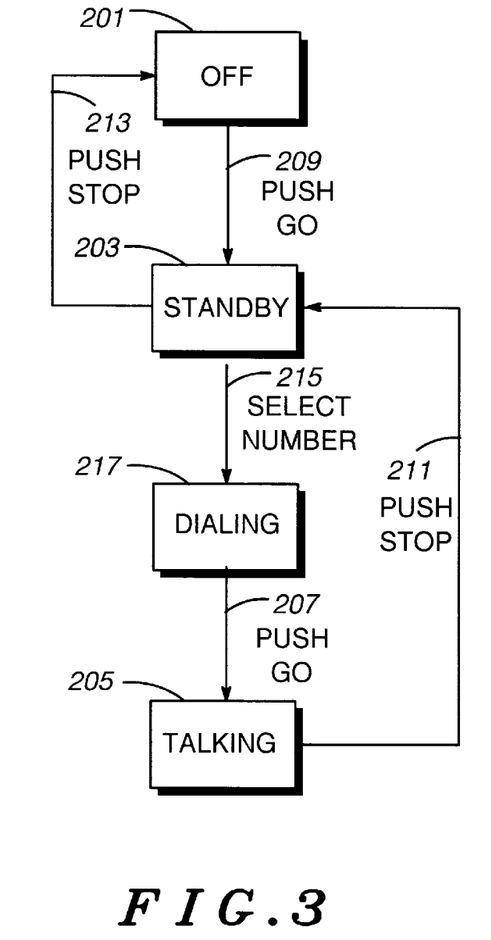
FIG. 3 is a state diagram of a basic phone call in accordance with the present invention.

FIG. 3 is a state diagram of a basic phone call in accordance with the present invention. The four states are the off state 201, the standby state 203, the dialing state 217 and the talking state 205. In general, to transfer states the user must press a data key 119, the stop key 125 or the go key 121. Specifically, to transfer from the off state 201 to the standby state 203 the user must select the go key 209. Moving from the standby state 203 to the off state 201 the user must select the stop key 213. In order to move from the standby state to the dialing state 217, the user must select a number 215. Moving from the dialing state 217 to the talking state 205 requires pushing the go key 207. To transfer from the talking state 205 to the standby state 203, the user must push the stop key 211.

Figure 4:
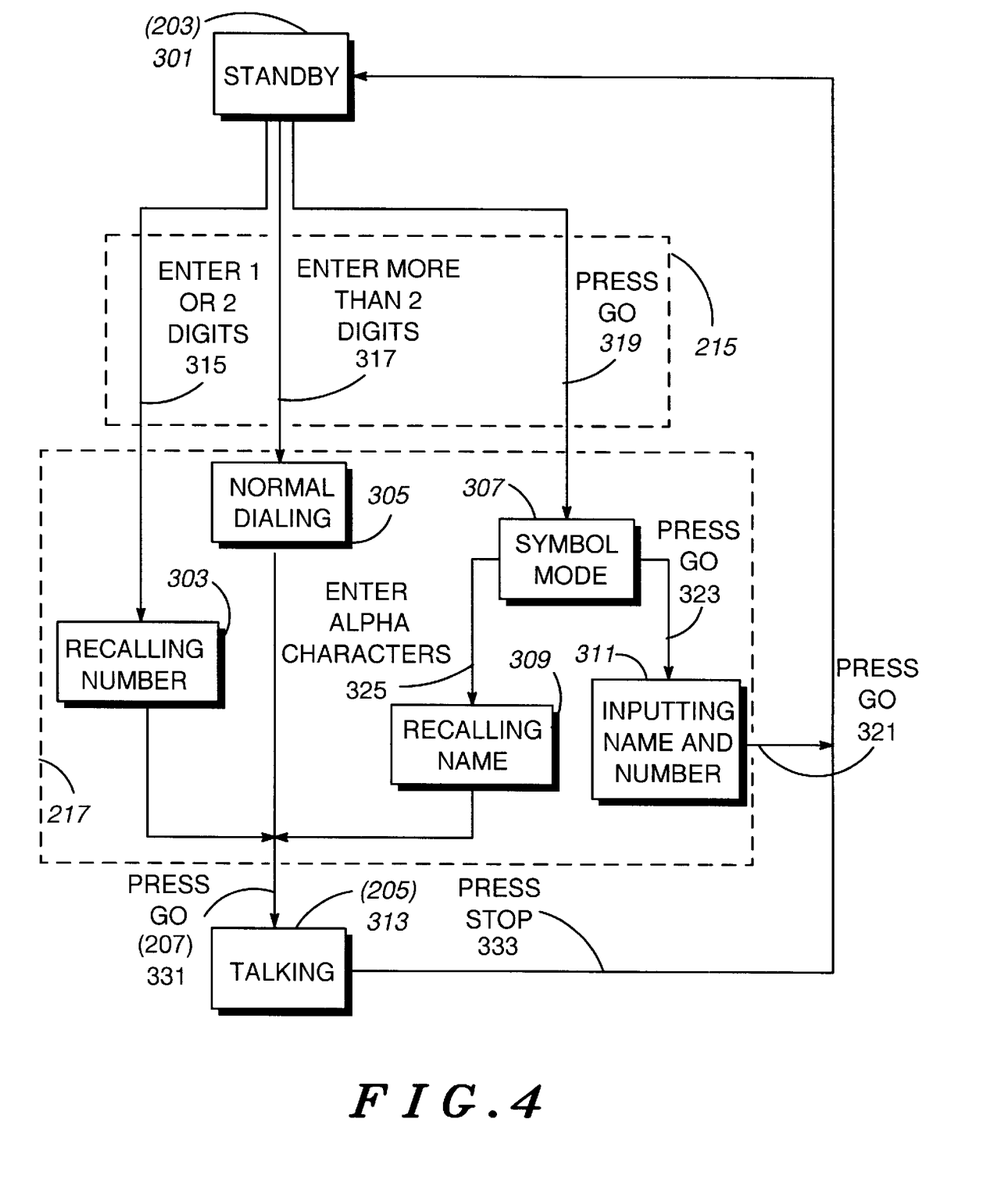
FIG. 4 is a state diagram of selecting a phone number in accordance with the present invention.

FIG. 4 is an exploded view of selecting a number 215 and the dialing state 217 from FIG. 3. There are three states within the dialing state 217: normal dialing state 305, recalling a number state 303, and recalling a name state 309. In order to transition between standby state 301 and the normal dialing state 305 the user must select a sequence of data keys which represent a phone number 317, for this embodiment the sequence must be larger than two data keys. In order to transition between standby state 301 and the recalling number state 303 the user must select a sequence of data keys which represent a memory 907 location within the memory of the radiotelephone, 101 for this embodiment it is one or two data keys. In order to transition between the recalling name state 309 and the standby state, the user must first transfer to the symbol mode state 307 by pressing the go key 319. The transfer from the symbol mode state 307 to the recalling name state 309 requires the user to enter a data key 119 which represents the symbol closest to the name in which the user is trying to recall at 325. Once the user has reached one of the dialing states 303, 305, 309 pressing the go key 331 will place the 101 radiotelephone into the talking state 313. Once in the talking state 313, one may press the stop key 333 which will end the call and return the caller to the standby state 301. While in the symbol mode state 307, the user has the option of inputting a new name and phone number instead of recalling a name and phone number. This can be accomplished by pressing the go key 323, thereby, transferring from the symbol mode state 307 to the inputting name and number state 311. While in the inputting name and number state 311, pressing the go key 321 will return the user to the standby state 301.

At any point in time when entering a sequence of data keys it may be necessary to clear one of the inputs or the entire data input depending upon how severe the mistake. FIG. 3 reveals the process for clearing data from the display 111. First, the process starts at 401, at 403 the user enters the sequence of the data keys 105, the user then will visually check the display 111 to see if the data is correct at 417. At 405, if it is not correct the user must press and hold the stop key 109. If the user wants to clear the last data key input at 411, then the stop key 109 must be released after the first beep at 407. If the entire data key input is to be cleared at 413, the stop key 109 must be released after the second beep at 409. This process is repeated until the data displayed is correct, then process is stopped at 415.

Figure 6:
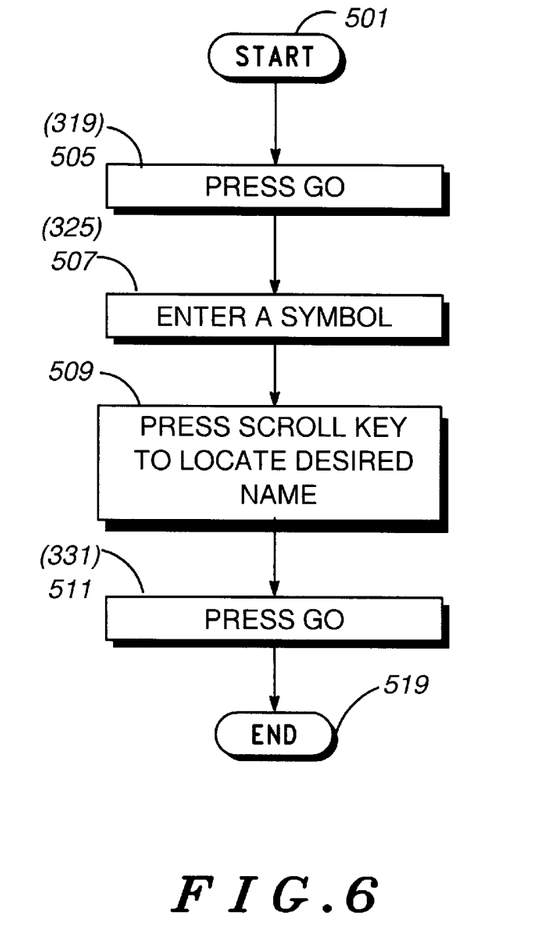
FIG. 6 is a process flowchart of recalling a name from the memory of a radiotelephone in accordance with the present invention.

FIG. 6 is the process flowchart for recalling a name from memory 907 which is part of the dialing state 217. The process is started at 501. At 505, the user presses the go key 121, this is also shown in FIG. 4 as transition action 319. Secondly, the user must enter a data key 119 which represents the symbol closest to the name in which the user is trying to recall at 507. This puts the user into close proximity to the name in which he wants to recall. For example, on a standard key input, if the user was to recall Bill, he would press data key 2 because it contains the letters A, B and C. Next, the user would use the scroll keys located on the "*" and "#" keys to scroll either in ascending alphabetical order or descending alphabetical order at 509 until the name is located. After the correct name is displayed on the radiotelephone 101, the go key 121 is pressed at 511, this completes the process of recalling a name from memory 907 and is the transition state 331 noted in FIG. 3.

Figure 5:
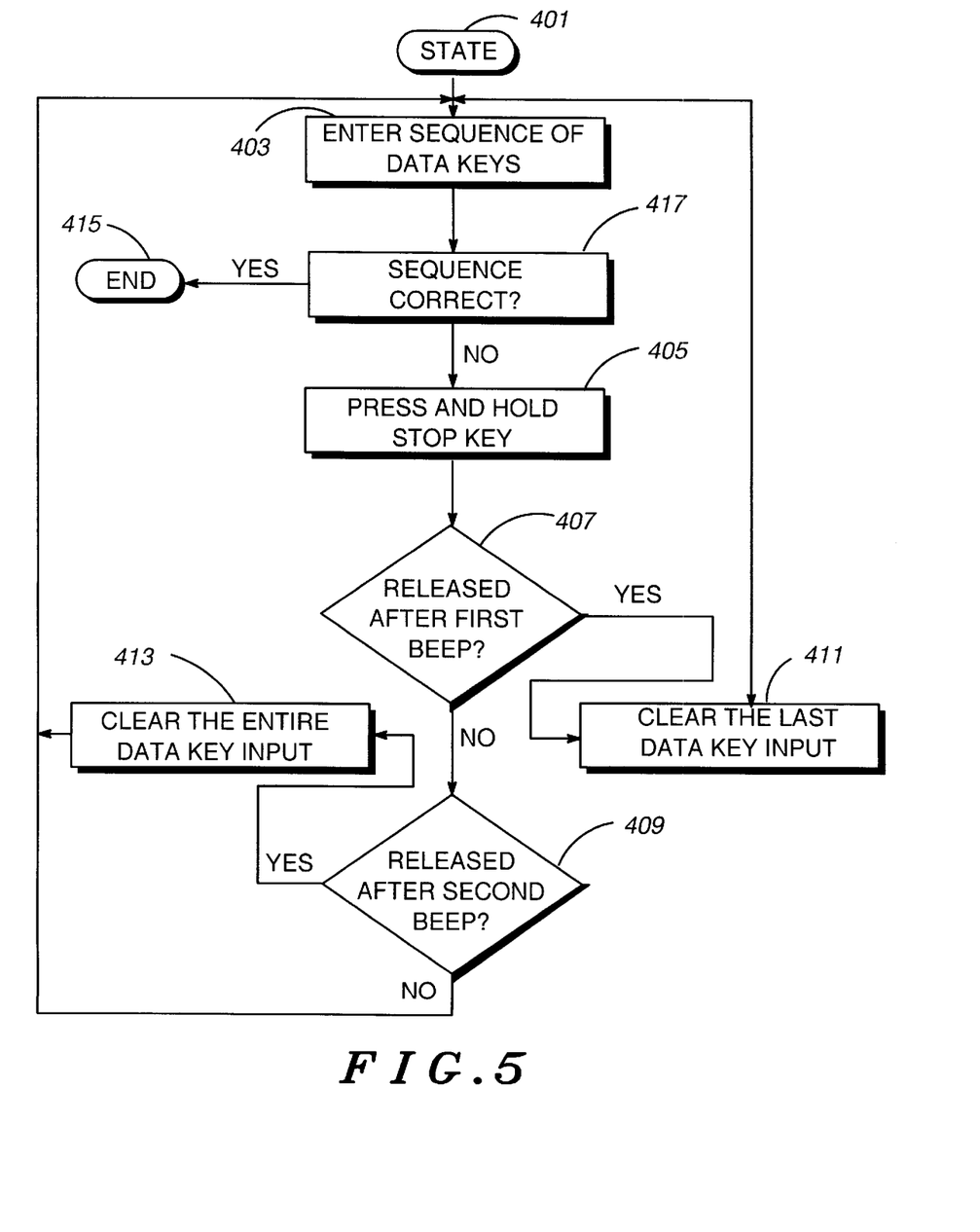
FIG. 5 is a process flowchart of clearing data input from the display of a radiotelephone in accordance with the present invention.
Figure 7:
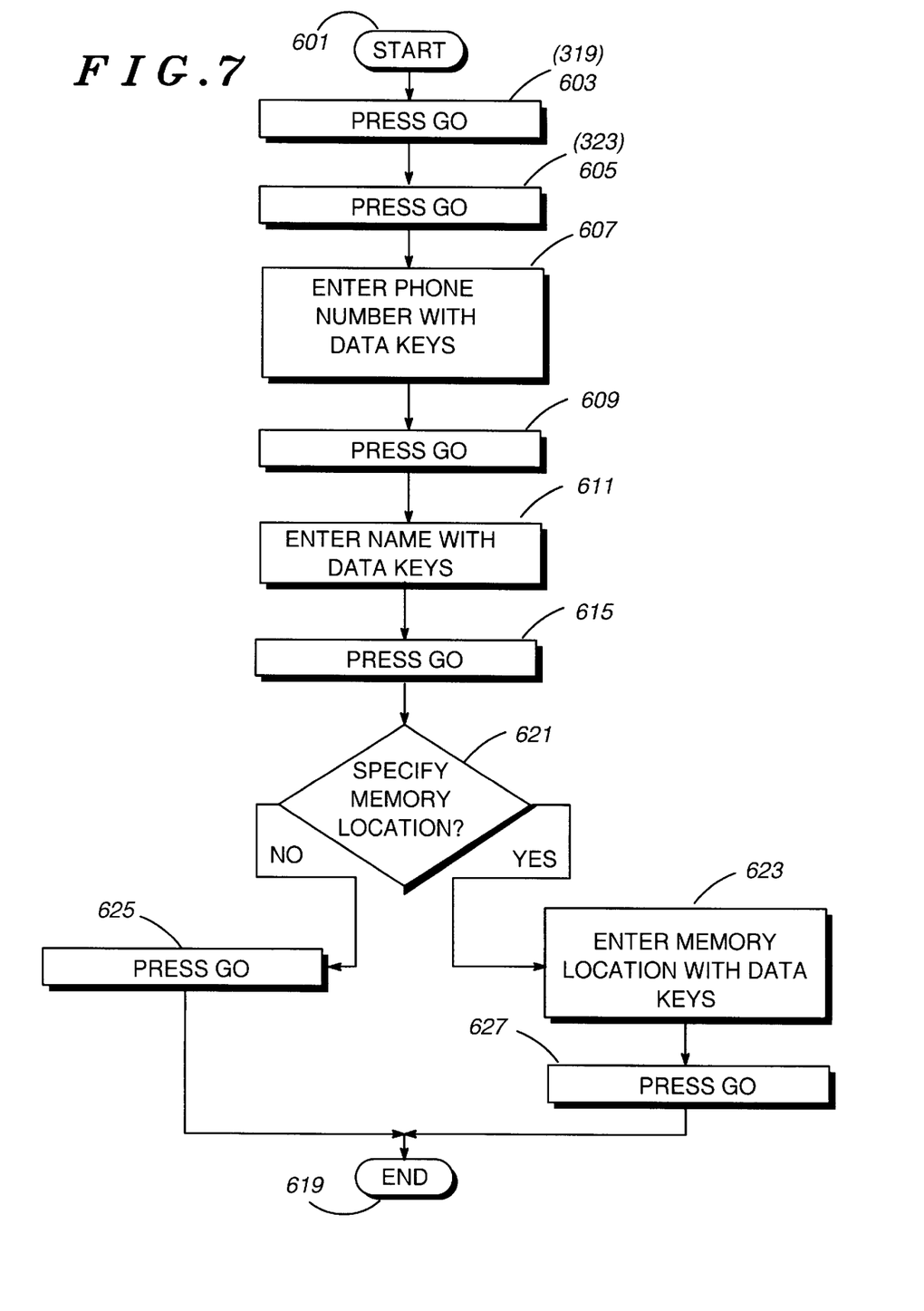
FIG. 7 is a process flowchart of storing a name and a phone number in the memory of a radiotelephone in accordance with the present invention.

FIG. 7 reveals the process which is used to enter phone numbers and corresponding names into the memory 907 of a radiotelephone 101 according to the present invention. The process starts at 601. At 603, the user presses the go key 121, entering the symbol mode state 307. At 605, the user presses the go key 121, enter the inputting name and number state 311. Here, the user selects the sequence of data keys representing a phone number. At 609, the user presses the go key 121 to store the number into the memory 907. At 611, the user enters the name which correlates to the above number with the data keys 119. Symbols can be entered with the standard keypad data keys 119 by depressing the designated data key a selected number of times. For example, when entering the word Bill into the display one would push the following data keys: 22 "#" 444 "#" 555 "#" 555. An alternate method of entering symbols is realized by pressing and holding the designated data key, the display 127 will scroll through the available symbols and when the key is released it holds the last displayed symbol. At any time during this data entry process the user may use the clear process as described in FIG. 5 to clear data key entries. At 615, after the symbol is entered correctly, the user presses the go key 121. At 621, the user decides whether to enter the specific memory location. If the user wants to enter the memory location, at 623 the memory location is entered with the data keys 119 and at 627 the go key 121 is pressed. If the user does not want to enter the memory location, then the go key 121 is pressed at 625 and the name and phone number are stored in the next available memory location. Optionally, the user may input the new names and phone numbers into the radiotelephone by first selecting the "#" key and releasing it after two beeps have sounded. This would place the user at 607 in the preceding process.

Figure 8:
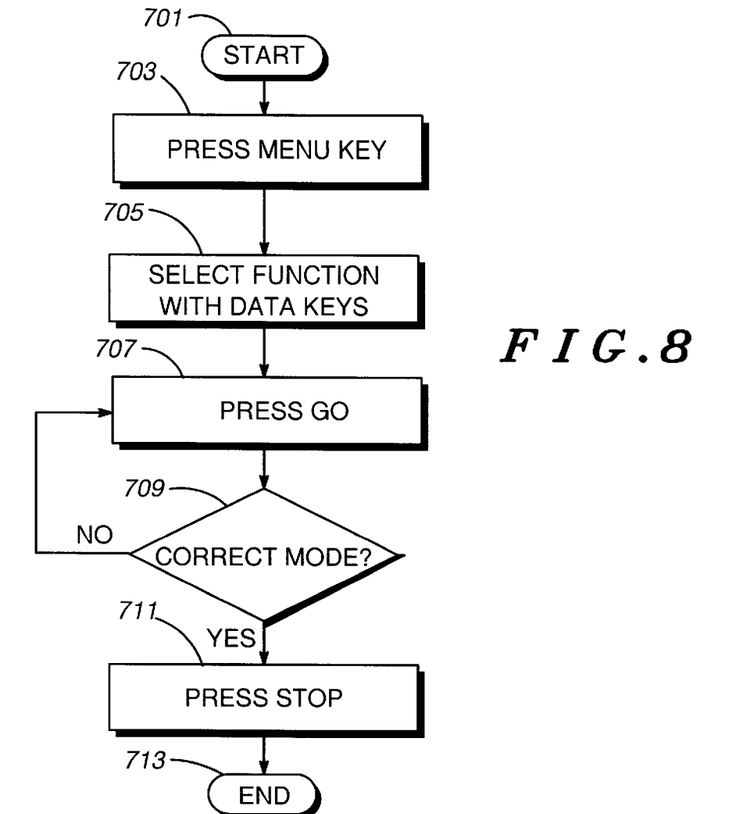
FIG. 8 is a process flowchart of selecting a mode of a menu function of a radiotelephone in accordance with the present invention.

FIG. 8 is a process flow chart of selecting modes of the menu functions. The functions include locking the phone, resetting the call timers, changing the unlock code or any of the functions that are available on a radiotelephone. The process starts by pressing a menu key at 703. The menu key can be activated by holding down the "*" key until two beeps sound or by pressing a menu function key 123, as shown in FIG. 2. At 705, the user enters the number representing the function with the data keys 119. Typically, there is a user's manual that accompanies all phones that states the numbers of each function. At 707, the go key 121 is pressed and the display shows the current mode of the function. If the mode is correct, at 711 the user presses the stop key 125. If the mode is not correct, at 707 the user presses the go key 121. The radio telephone will either toggle between two modes or step to the next mode if there are more than two possible modes. After the correct mode is selected at 709, the user presses the stop key at 711 and it stores the proper mode of the function into the memory 907 of the radiotelephone 101.

Figure 9:
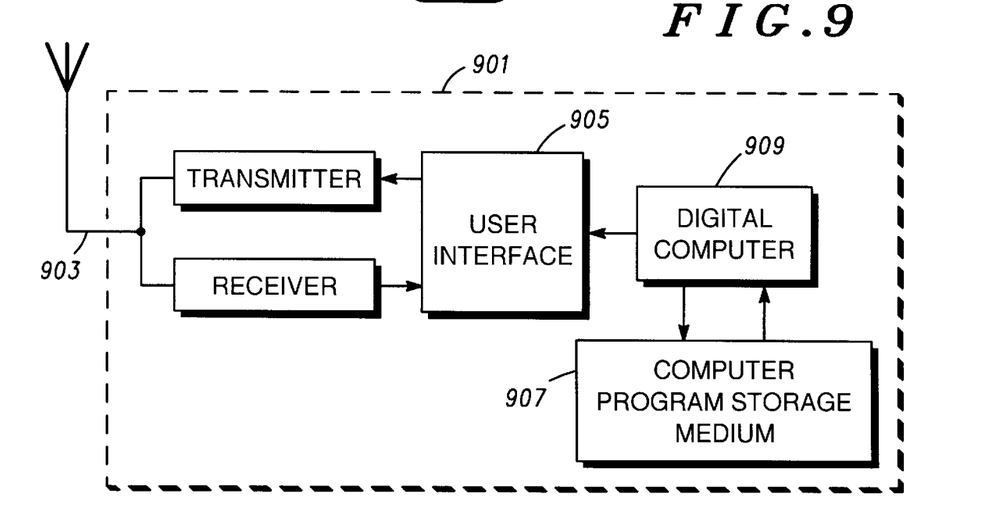
FIG. 9 is a block diagram of a radiotelephone which may employ the present invention.

FIG. 9 is a block diagram of a radiotelephone 901 which may employ the present invention. The radiotelephone 901 includes a computer program storage medium 907, commonly referred to as a memory device, a digital computer 909, and an user interface 905. The user interface 905 includes a microphone, a speaker, a display, data keys and function keys. The display, data keys and function keys are illustrated in FIG. 1 and FIG. 2. The computer program storage medium 907, the digital computer 909 and the user interface 905 used in conjunction with each other to form a radiotelephone operations controller. The radiotelephone operations controller controls the function of the radiotelephone 901.

Described herein is a method of controlling the functions of a radiotelephone with only two or three function keys. The radiotelephone 101 has many of the advanced functions of current radiotelephones without the complexity involved in utilizing the functions of the current radiotelephones. The functions as described are intuitive to the uneducated radiotelephone user.

What is claimed is:

1. A method of operating a radiotelephone, the radiotelephone including a memory, a display, and a keypad with at least a first single-throw function key, a second single-throw function key, and a plurality of data keys, the method comprising the steps of:

in response to an actuation of the first single-throw function key, entering a mode for accessing a telephone number from the memory;

in response to a subsequent actuation of the first single-throw function key, connecting a telephone call based on a selected telephone number;

in response to an actuation of the second single-throw function key, disconnecting the telephone call;

in response to a subsequent actuation of the second single-throw function key, turning off the radiotelephone; and wherein said first single-throw function key does not revert back to the function of entering a mode for accessing a telephone number unless the telephone call has been disconnected by the actuation of the second single-throw function key.

2. The method in accordance with claim 1 further including the step of:

in response to an actuation of at least one key of the data keys occurring after the actuation of the first single-throw function key, recalling a name from the memory that corresponds to a telephone number.

3. The method in accordance with claim 1 further including the step of:

in response to a subsequent actuation of the first single-throw function key occurring before said step of connecting a telephone call, entering a mode for entering a telephone number into the memory.

4. A method of operating a radiotelephone, the radiotelephone including a memory, a display, and a keypad with at least a first single-throw function key, a second single-throw function key, and a plurality of data keys, the radiotelephone operating in a standby mode and a talk mode, the method comprising the steps of:

in response to an actuation of the first single-throw function key, when the radiotelephone is in the standby mode and a telephone number has not been selected, entering a mode for accessing a telephone number from the memory;

in response to an actuation of the first single-throw function key, when the radiotelephone is in the standby mode and a telephone number has been selected, connecting a call based on the telephone number, thereby entering the talk mode;

in response to an actuation of the second single-throw function key, when the radiotelephone is in the talk mode, disconnecting the call, thereby entering the standby mode; and in response to an actuation of the second single-throw function key, when the radiotelephone is in the standby mode, turning off the radiotelephone.

5. The method in accordance with claim 4 further including the step of:

in response to an actuation of at least one key of the data keys, recalling a name from the memory that corresponds to a telephone number.

6. The method in accordance with claim 4 further including the step of:

in response to a subsequent actuation of the first single-throw function key occurring before said step of connecting a telephone call, entering a mode for entering a telephone number into the memory.

7. A method of operating a radiotelephone, the radiotelephone including a memory, a display, and a keypad with at least a first single-throw function key, a second single-throw function key, and a plurality of data keys, the radiotelephone operating in a standby mode and a talk mode, the standby mode including a menu mode, the method comprising the steps of:

in response to an actuation of the first single-throw function key, when the radiotelephone is in the standby mode and a telephone number has been selected, connecting a call based on the telephone number, thereby entering the talk mode;

in response to an actuation of the second single-throw function key when the radiotelephone is in the talk mode, disconnecting the call, thereby entering the standby mode;

when the radiotelephone is in the menu mode and the display shows a selected function, in response to an actuation of the first single-throw function key, changing a current mode of the selected function; and in response to an actuation of the second single-throw function key when the radiotelephone is in the menu mode, maintaining the current mode of the selected function.

8. The method in accordance with claim 7 wherein the selected function is a phone locking function.

9. The method in accordance with claim 7 wherein the radiotelephone further includes a third single-throw function key, and the method further comprises the steps of:

in response to an actuation of the third single-throw function key and a subsequent actuation of at least one key of the data keys, entering the menu mode with the display showing the current mode of the selected function.

10. A method of operating a radiotelephone, the radiotelephone including a memory, a display, and a keypad with at least a first single-throw function key, a second single-throw function key, and a plurality of data keys, the radiotelephone operating in a standby mode and a talk mode, the method comprising the steps of:

in response to an actuation of the first single-throw function key when the radiotelephone is off, turning on the radiotelephone, thereby entering the standby mode;

in response to actuations of the data keys when the radiotelephone is in the standby mode, displaying a telephone number in the display;

in response to an actuation of the first single-throw function key when the radiotelephone is in the standby mode and the telephone number is shown in the display, connecting a telephone call based on the telephone number, thereby entering the talk mode;

in response to an actuation of the second single-throw function key during the standby mode when the telephone number is shown in the display, at least partially clearing the telephone number in the display; and in response to an actuation of the second single-throw function key during the talk mode, disconnecting the call, thereby entering the standby mode.

11. A method of operating a radiotelephone, the radiotelephone including a memory, a display, and a keypad with at least a first single-throw function key, a second single-throw function key, and a plurality of data keys, the radiotelephone having a standby mode and a talk mode, the method comprising the steps of:

in response to an actuation of the first single-throw function key during the standby mode when a telephone number has not been selected, entering a mode for recalling a telephone number from the memory;

in response to an actuation of the first single-throw function key during the standby mode when a telephone number has been selected, attempting to connect a call, thereby entering the talk mode;

in response to an actuation of the second single-throw function key during the standby mode when a telephone number has been selected and shown in the display, at least partially clearing the telephone number from the display; and in response to an actuation of the second single-throw function key during the talk mode, disconnecting the call, thereby entering the standby mode.

12. The method in accordance with claim 11 wherein said step of at least partially clearing the telephone number further includes the steps of:

in response to an extended actuation of the second single-throw function key, clearing the telephone number shown in the display; and in response to a non-extended actuation of the second single-throw function key, clearing a last digit of the telephone number shown in the display.

13. The method in accordance with claim 11 further including the step of:

in response to an actuation of at least one key of the data keys after the actuation of the first single-throw function key, recalling a name from the memory based on the at least one key of the data keys.

* * * * *